United States Patent [19]

Simons

[11] Patent Number: 4,815,909

[45] Date of Patent: Mar. 28, 1989

[54] WOOD SCREW AND METHOD FOR MAKING SAME

[76] Inventor: Leon Simons, 303 E. 57th St., Apartment 47E, New York, N.Y. 10022

[21] Appl. No.: 932,248

[22] Filed: Nov. 19, 1986

[51] Int. Cl.⁴ .............................................. F16B 35/00
[52] U.S. Cl. .................................... 411/392; 411/421; 411/425
[58] Field of Search ............... 411/417, 425, 418, 420, 411/421, 394, 412, 386, 392

[56] References Cited

U.S. PATENT DOCUMENTS 1,708,793  4/1929  Jones .................................. 411/421

FOREIGN PATENT DOCUMENTS

| 675810 | 5/1966 | Belgium | 411/425 |
| 667051 | 2/1952 | United Kingdom | 411/417 |
| 1120991 | 7/1968 | United Kingdom | 411/417 |
| 1219237 | 1/1971 | United Kingdom | 411/392 |

*Primary Examiner*—Neill Wilson
*Attorney, Agent, or Firm*—Blum Kaplan

[57] ABSTRACT

A wood screw has a resilient shaft carrying a spiral thread of nominal pitch from the tip. The thread is interrupted at a plurality of intervals and the shaft is torsionally resilient. When the screw fastener is driven, the shaft twists and contracts so that the thread in the mating material has a pitch which is less than the nominal pitch. The interrupted thread may consist of a plurality of resilient lobes.

2 Claims, 5 Drawing Sheets

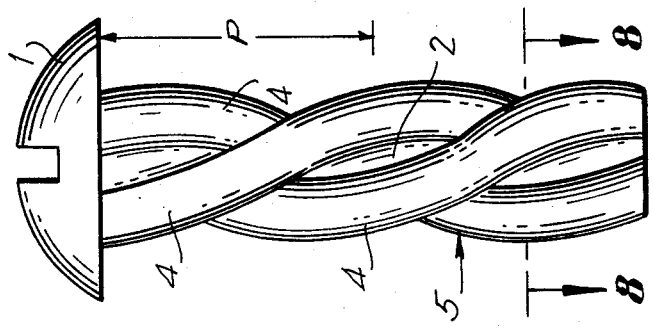
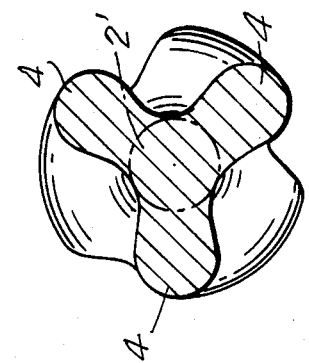
FIG. 7
FIG. 8
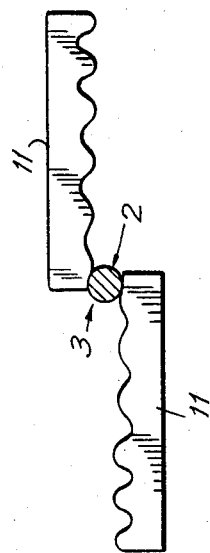
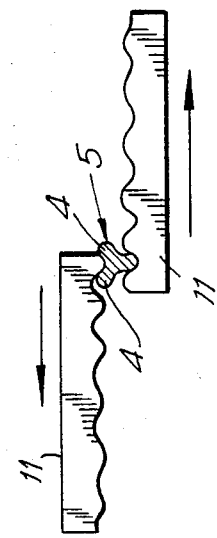
FIG. 5
FIG. 6

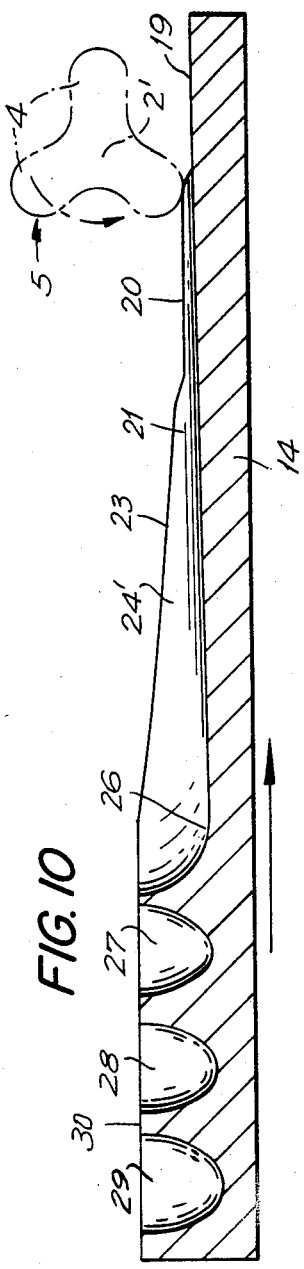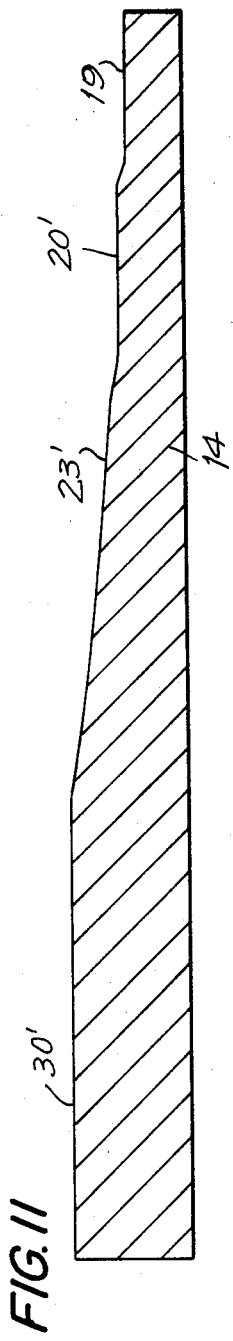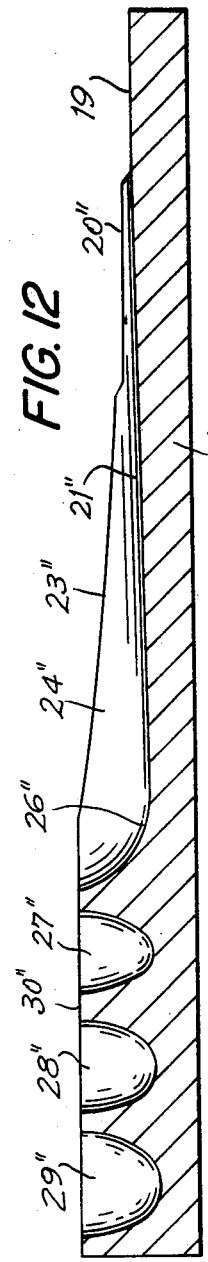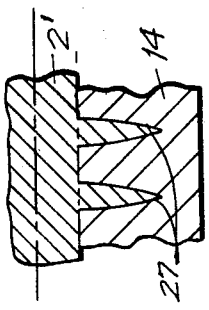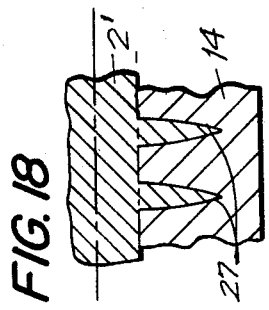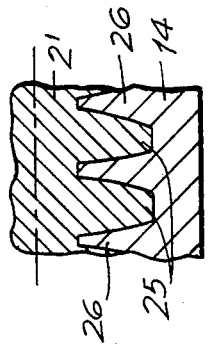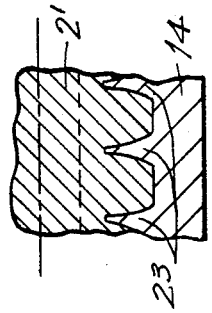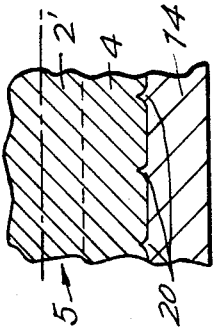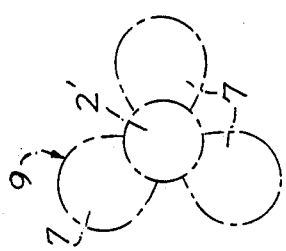

WOOD SCREW AND METHOD FOR MAKING SAME

BACKGROUND OF THE INVENTION

The present invention relates to screw fasteners. More particularly, the invention relates to wood screws which have uniquely formed interrupted threads and inherent resiliency so as to provide enhanced resistance to loosening.

Conventional screws used in fastening to boards of wood, chip-board, and the like are provided with continuous threads which are screwed into the board with such force as to make a thread in the board to achieve a degree of fastening. Such screws are rigid and, even though considerable force must be utilized in driving the screw to part the material of the board, can loosen because of limited resistance to reverse motion of the screw thread along the mating thread in the board. Thus, known wood screws are likely to become loose in time unless spring washers, or other devices are placed under the head of the screw. It has also been a practice to use glues in conjunction with screws in order to obtain more reliable and secure joints. However, glues harden and crystallize in time, allowing loosening, and glues tend to bleed into the wood with attendant discoloration. Furthermore, both the use of spring washers and the application of glue involve added cost and inconvenience.

There is need, therefore, for a wood screw which, after being driven in a mating part will inherently provide enhanced resistance to loosening.

SUMMARY OF THE INVENTION

In general, the present invention provides a self-starting rotationally-resilient wood screw having an interrupted thread. In a preferred embodiment, the interrupted thread consists of a series of resilient lobate elements which are disposed in a spiral around the shank of the screw. The screw is formed by first rolling a plurality of relatively deep lobes on spirals of relatively high pitch onto the shank of a pre-headed steel blank by means of a pair of dies. The deeply lobed blank so produced is then rolled in a second set of dies to forcibly deform the deep lobes into a series of individual oblong lobes each of which has wide surfaces which together form a spiral thread of low pitch on a resilient shaft. In the illustrated embodiment, the thread is double-spaced, and the root of each lobe is greatly reduced, so that the blades are spaced apart from each other along the surface of the shaft. Due to the combination of the relatively high pitch of the deeply lobed blank and the relatively low pitch of the thread formed by the series of lobes, the finished screw appears so that, as the screw threads advance to the right, the lobes advance progressively to the left, with the crests of each lobe in the series appearing to form a spiral. The angle of the line which the spiral makes with the screw thread is a function of the tensile strength of the steel used for the screw, the screw size, etc. The major diameter of the resulting screw is that of a standard wood screw. The minor diameter, e.g. the diameter of the shaft of the screw, is considerably less than the major diameter and provides rotational springiness under normal screw driving conditions, while maintaining the overall strength of the screw. For starting the screw, a conventionally threaded, pointed tip is provided.

When the screw is driven, considerable torque is required at first to drive the point in, and the resilient shaft twists. Due to the twist, the screw tends to wind up on itself and to contract. As the lobed main section of the screw enters the wood, the screw continues to be twisted on itself. As each lobe is driven into the wood, it is somewhat deflected to the rear. Thus, while the screw is being driven and when the driving is complete, both the shaft of the screw and the lobes are under torsion, with each of the lobes assisting in maintaining that condition. The result is that, since the driven screw is in a contracted condition, the pitch of the threaded hole in the wood differs from the original, nominal pitch of the screw threads.

Due to the state of torsion of the driven screw and the stress energy stored therein, the screw tends to unwind, causing the shaft and the lobes of the screw thread to tend to relocate to a position of less stress. However, because of the differences between the pitch of the undriven screw and the pitch of the threaded hole, an out-of-pitch condition is created which interferes with further unwinding of the screw and which, because of the interference, provides resistance to loosening of the screw in the hole. Also, due to the slight untwisting of the screw which occurs after driving, the major diameter of the screw threads enlarges as the screw decontracts, creating a further mismatch with the now smaller dimensions of the thread in the wood.

The screw of the invention, therefore, is in a constant state of torsion which resists backing out. Further, should the wood expand when warmed, the screw will give up some torsion and expand to a different pitch and to a different major diameter to take up the slack. In the case of wood rot, the screw will expand to maintain a tight bond. In areas of soft grain, portions of the screw will shift to accommodate the different densities so that, regardless of the grain, a constant tight bond is maintained, effectively preventing further loosening.

An object of the invention, therefore, is to provide a wood screw which, after being driven, provides enhanced resistance to subsequent loosening.

Another object of the invention is to provide a wood screw which reduces the freedom of the screw to back out after being driven.

Still another object of the invention is to provide a wood screw in which the thread, in the undriven condition, differs from the pitch of the threaded hole which is produced by the driven screw.

A further object of the invention is to provide a wood screw which is secure against loosening, thereby obviating the need for spring washers, glue, or other devices.

It is still another object of the invention to provide a wood screw which provides protection against loosening without the additional cost of other devices.

A still further object of the invention is to provide a wood screw which provides high resistance to loosening without the use of glue, thereby avoiding the subsequent hardening and crystallization of the glue which allows loosening, and avoiding the tendency of the glue to bleed into the wood with attendant discoloration.

Another object of the invention is to provide a wood screw which provides protection against loosening without leaving wood-chips.

Still another object of the invention is to provide a wood screw which is in a constant state of tension after being driven so that its screw thread will be mismatched in pitch and major diameter with the thread which is formed in the wood.

It is a further object of the invention to provide a method for making a wood screw which meets the aforegoing objects in an efficient and economical manner.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which:

FIGS. 5 and 6, respectively, depict the relative positions of the first pair of dies and the pre-headed blank at the starting and at the finishing positions of the first screw-forming step;

FIG. 7 is an elevational view of the screw blank with the deep lobes produced by the first rolling step;

FIG. 8 is a partially sectional view taken along lines 8—8 of the lobed screw blank of FIG. 7;

FIGS. 10, 11, and 12, are partial sectional views taken along lines 10—10, 11—11 and 12—12, of FIG. 9, showing respective profiles of the die of FIG. 9;

FIGS. 15–18 are sectional views depicting the lobes of the screw thread at various stages of formation as the lobed screw blank passes between the dies of FIGS. 10 and 11, the views being taken along lines 15—15, 16—16, 17—17, and 18—18, respectively, of FIG. 9;

DETAILED DESCRIPTION OF THE INVENTION

Figure 1:
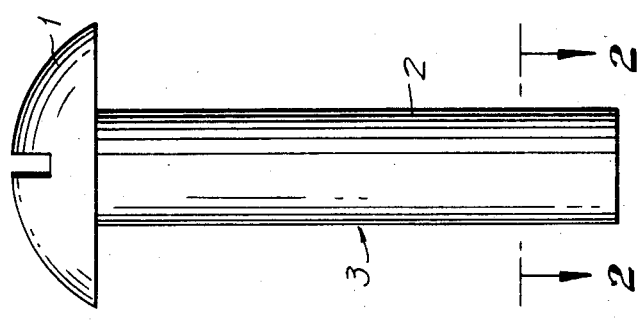
FIG. 1 is an elevational view of a pre-headed blank which is used in forming a screw according to the teachings of the invention.
Figure 2:
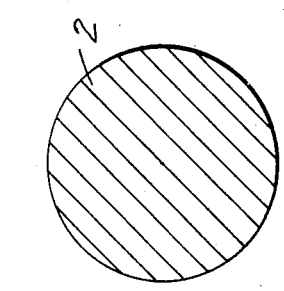
FIG. 2 is a sectional view along lines 2—2 of FIG. 1 showing the circular nature of the shank of the blank.

A blank 3 from which the screw of the invention is made is depicted in elevation in FIG. 1 and in cross-section, on a larger scale, in FIG. 2. The finished product 9 is shown in elevation in FIG. 19 and in enlarged partial cross-section in FIG. 20.

Figure 19:
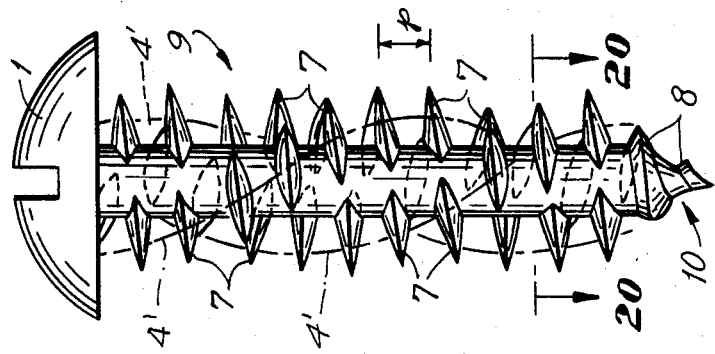
FIG. 19 is an elevational view of the finished screw of the invention.
Figure 20:
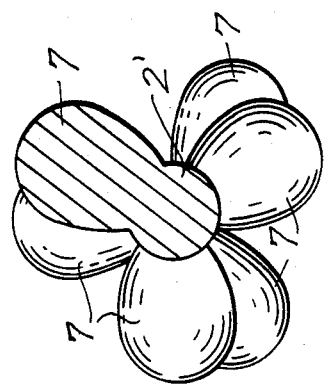
FIG. 20 is an enlarged, partially sectional view taken along lines 20—20 of FIG. 19.

As depicted in FIGS. 1 and 2, blank 3 has an elongate cylindrical shank 2 which is flat on the lower end, and is pre-headed, in a manner known in the art, to provide a screw head 1 having the illustrated rounded, slotted configuration. The blank may, of course, be provided with another head structure such as a hexagonal head, a Phillip's head, or the like, in a manner well known in the art. Screw blank 3 is made of steel or other metal which provides the below-described resiliency in the finished screw. As can be seen in FIGS. 19 and 20, the finished screw has a shaft 2' of a diameter which is substantially reduced, compared to the shank 2 of the screw blank of FIG. 2, due to the shaping of material from the original shank 2 into a plurality of individual thread lobes or segments 7 which radiate from the shaft to the major screw diameter which is substantially greater than the diameter of shaft 2'. As depicted in FIG. 19, thread lobes 7 are positioned at successive intervals on the shaft of the screw, forming a thread of relatively low pitch which spirals from the inner end of continuous tip thread 10 to screw head 1. In the illustrated embodiment, the thread lobes 7 are spaced apart on the low pitch spiral at intervals of slightly more than 120° from each other, as established by the pitch of the high pitch spirals 4' (FIG. 19). The latter pitch is that which is imparted to the blank during its formation, as will be described below. As illustrated, the low-pitched screw thread which is formed by lobes 7 is double spaced, that is, adjacent portions of the screw thread at the same angular position along shaft 2' are separated from each other by twice the width of lobes 7. The screw thread is right-handed so that, while the screw thread appears to advance to the right, the lobes 7 appear to advance to the left on the high-pitched spirals 4'. The angle of the line which each spiral makes with the screw thread is a function of the tensile strength of the steel used for the screw. The minor diameter, e.g. the diameter of the screw shaft 2' is such that the screw will have rotational resilience when subjected to a driving torque and so will have the capability of storing energy when in place, while maintaining the overall strength of the screw itself. In addition, the thin lobes of the thread which can have, as illustrated, the general appearance of the blades of a ship's propellor, are also resilient, and contribute to the behavior of the driven screw.

As described above, when being driven into wood, panelboard, or the like, the screw of the invention contracts, since it winds up on itself. Thus, the considerable torque which is required to drive the point of the screw into wood, together with the drag provided by the individual lobes as they enter the wood, will continue to twist the screw. The resulting contraction of the screw shortens it, reducing the pitch of the screw thread, as well as reducing the major diameter of the screw. Since the pitch of the threaded hole which has been produced by driving the contracted screw into the wood is less than the pitch of the unwound screw, e.g. the pitch before the screw has been driven, there is a mismatch between the respective pitches. Therefore, since the screw tends to unwind when driving is complete, due to the energy which has been stored in it, and since the pitch of the unwinding screw differs from that of the threaded hole in the wood, the surfaces and tips of the thread lobes are forced against the sides of the thread in the wood to provide resistance to backwards motion of the screw. The ordinary resistance of a screw to loosening and backing-out is thereby enhanced.

The multilobed screw of the invention is fabricated as follows. In a first step, a pre-headed blank 3 is rolled in between two steel dies 11 as shown in FIGS. 5 and 6 to produce a blank 5 of deep-lobed intermediate form, as depicted in FIGS. and 8. The deep lobes 4 of the intermediate screw blank 5 have a relatively high pitch P (FIG. 7). By comparing FIG. 2 with FIG. 8, it can be seen that a substantial amount of the material of shank 2 of the original blank has been displaced to form the three lobes 4 of intermediate blank 5, each lobe having a radius which is substantially greater than that of the resulting basic shaft 2'.

Figure 3:
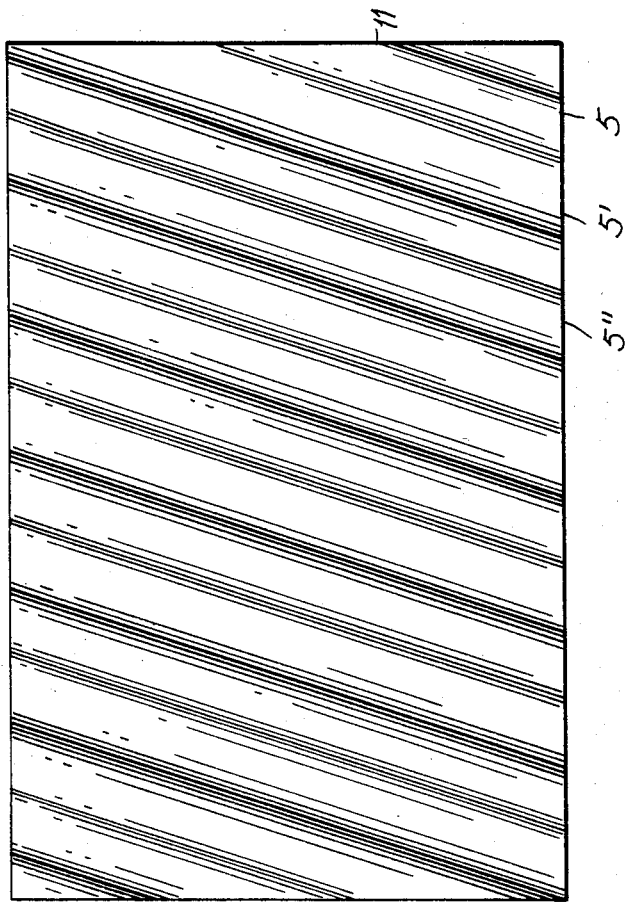
FIGS. 3 and 4 are, respectively, elevational and partially sectional views of one of a first pair of dies which is used in forming the screw of the invention.
Figure 4:
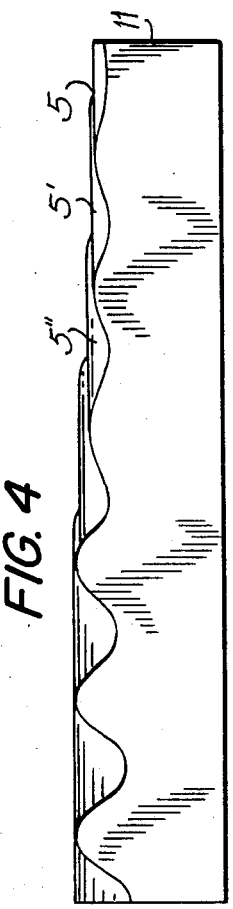

The transformation of blank 3 into the intermediate blank 5 of FIGS. 7 and 8 is effected, in a manner well known in the art, by rolling or kneading between two mating, oscillating dies 11, one of which has the configuration depicted in FIGS. 3 and 4 and the other of which has the same configuration, but reversed in the known manner. Each of the dies has progressively deepened lobe-forming recesses 5, 5', 5", etc. which are milled or ground into its surface. At the start of the first rolling operation, dies 11 and shank 2 of blank 3 are positioned relative to one another as shown in FIG. 5. Then, after movement of the dies past one another during which blank 3 is under continuous pressure, the blank is gradually formed, by operation of the dies as they are shifted relative to one another in the direction of the arrows (FIG. 6), into the intermediate blank 5 of FIGS. 7 and 8.

Figure 13:
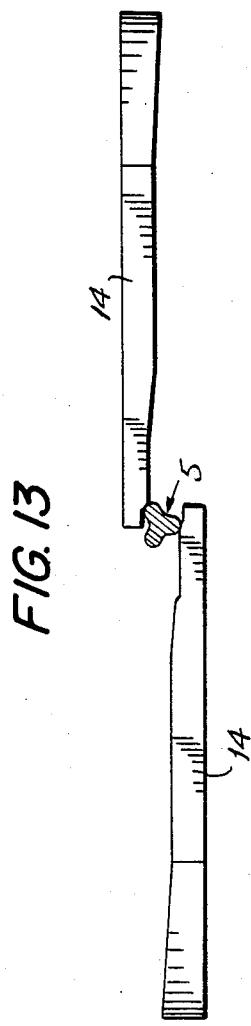
FIGS. 13 and 14, respectively depict the relative positions of the second pair of dies and the lobed blank at the starting and the finishing positions of the second forming step.
Figure 14:
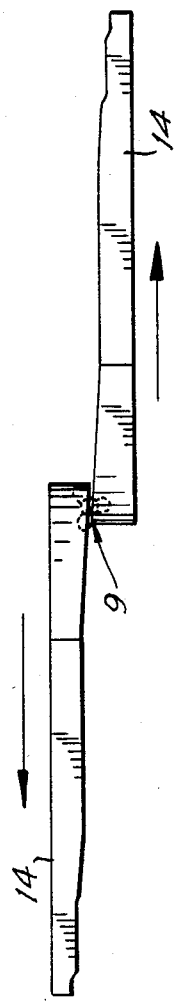

After appropriate annealing, blank 5 is placed, for a second and final forming operation, between a second pair of mating steel dies 14, (FIGS. 13 and 14) one of which has the configuration depicted in FIGS. 9-12 and the other of which has a like, mating configuration. As the rolling progesses, the dies are moved past each other from the position of FIG. 13 to that of FIG. 14. In the process, blank 5 is shaped into the finished screw 9, which is depicted in FIGS. 19 and 20. In the second rolling, lobes 4 of intermediate blank 5 are transformed from continuous, deep lobes of relatively high pitch, to a plurality of planate, petal-shaped lobes which lie on both the high pitched spirals 4' (FIG. 19) which were established by deep lobes 4 of blank 5, and on a thread spiral, of low pitch p and of many turns around shaft 2'. At the same time, a spiral starting thread 10 of about one and one-half to two turns has been formed on tip 8 as it is being shaped into a cone.

Figure 9:
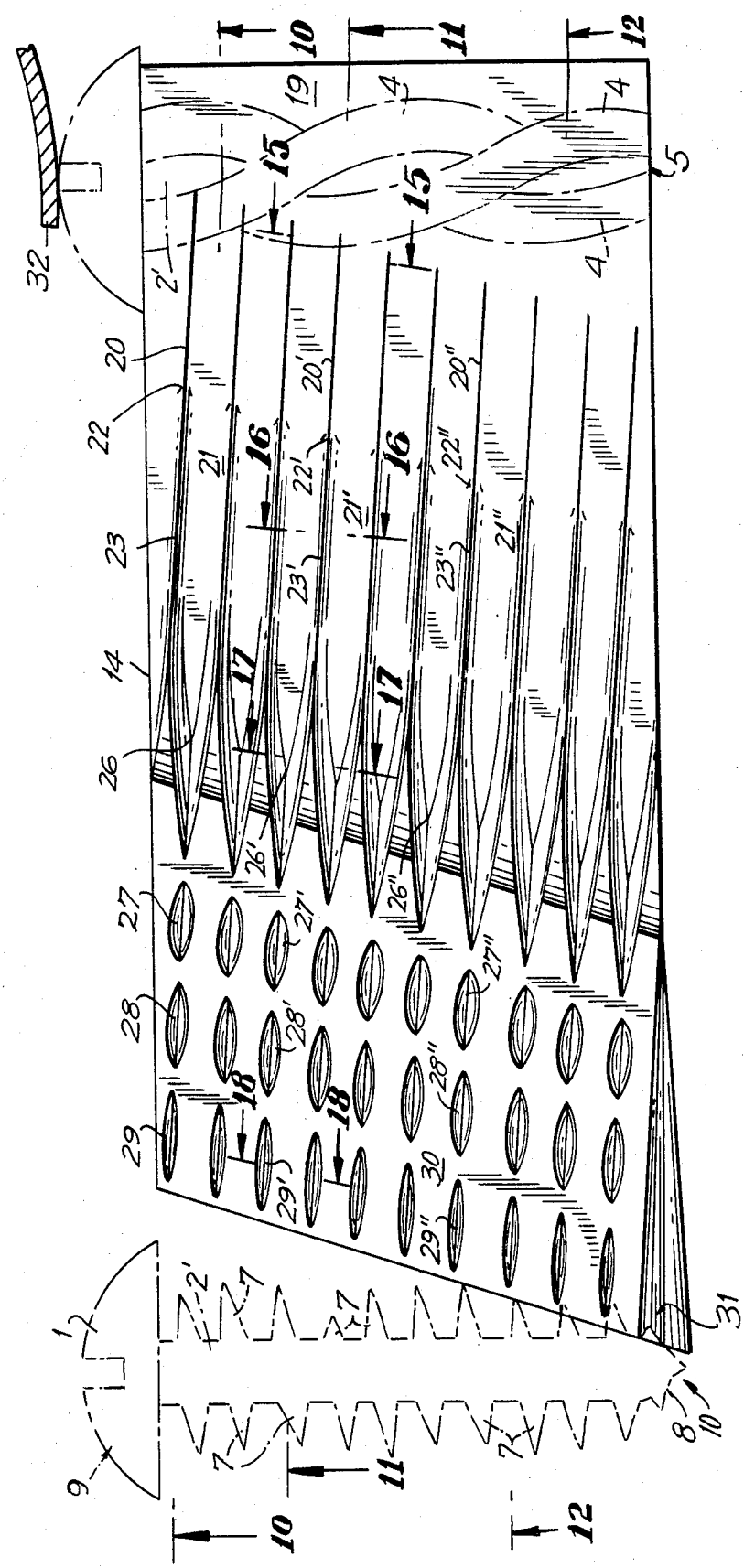
FIG. 9 is a plan view of one of a second pair of dies which is used to form the finished screw from the lobed blank of FIGS. 7 and 8.

The profiles of dies 14 are depicted in cross-section in FIGS. 10, 11, and 12, and were taken parallel to each other along the cutting planes designated by corresponding numbers in FIG. 9. The stages of formation of the lobes progresses as the dies progress from the positions of FIG. 13 to the positions of FIG. 14, as depicted, in cross-section, in FIGS. 15-18. Each die 14, is reduced in thickness to provide a starting surface 19 which receives blank 5. The other end of each die has a plane surface 30 which is elevated above the level of starting surface 19. When the dies are in the starting position (FIG. 13), the spacing between opposing starting surfaces 19 is equal to the major diameter of the lobes on screw blank 5. When the dies have reached the finishing position (FIG. 14), the space between the opposing die surfaces 30 is equal to the diameter of basic shaft 2' of blank 5, establishing the diameter of shaft 2' of finished screw 9. To the left of starting surface 19 and including finishing surface 30, the material of the die blank has been removed to produce the die contours shown in profile in FIGS. 10-12 and in elevation in FIG. 9. Thus, ridges of the die which contribute to the initial segmentation of the lobes of blank 5, are respectively designated 20 in FIG. 10, 20' in FIG. 11, and 20" in FIG. 12. A plurality of the ridges 20, and their initial effect in the segmentation of a lobe 4 can be seen in cross-section in FIG. 15. Progressing leftwards along the die, the grooves 21, 21', and 21", which are formed between the various ridges 20, are seen to be deepened (FIG. 9) as the elevations of the ridges rise (23, 23', and 23"), while the floor of the groove slopes gradually downward. The effect of the increased ridge elevation 23 upon the lobe 4 is depicted in FIG. 16. Still further to the left, the sloping side walls of each groove 21 begin to merge to meet at points 26, 26' and 26", where the grooves have reached maximum depth. The grooves 21 then gradually taper out as the side walls terminate in finishing surface 30. At this time, as shown in FIG. 17, the screw blank has a plurality of separate lobes 25 which rise from the basic shaft 2'. Finally, as the screw blank is rolled along finishing surface 30, the individual lobe preforms 25 of FIG. 17 are respectively formed by recesses 27, 27", 28, 28", and 29, 29" into separate series of three lobes 7 each, which are spaced around shaft 2' of finished screw 9. Concurrently with the final shaping of each series of thread lobes 7 in die recesses 27, 28, and 29, a starting screw thread 8 is formed on tip 10 of the screw by the action of continuous thread forming groove 31 in die 14.

While the screw of the invention has been described above as made of steel, it will be apparent to those skilled in the art that other materials can be employed which provide the requisite resilience in the screw shaft and in the thread lobes to provide the necessary contraction of the screw when it is driven.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A screw fastener for insertion into an object comprising:
    a screw head, a shaft formed integrally on said screw head, and drag means for shortening the length of the shaft as the fastener is inserted into the object; wherein said drag means includes a thread of nominal pitch spiralling around said shaft from a starting tip, said thread being interrupted at a plurality of intervals; and wherein said shaft is torsionally resilient so that as said fastener is inserted into said object, said shaft twists and contracts to produce a thread having a pitch which is less than said nominal pitch; and wherein the thread includes a plurality of lobes having an elongate cross-section which lies in a plane of said thread and wherein the elongate cross section is substantially petal shaped.

2. A screw fastener for insertion into an object comprising:
    a screw head, a shaft formed integrally on said screw head, and drag means for shortening the length of the shaft as the fastener is inserted into the object; wherein said drag means includes a thread of nominal pitch spiralling around said shaft from a starting tip, said thread being interrupted at a plurality of intervals; and wherein said shaft is torsionally resilient so that as said fastener is inserted into said object, said shaft twists and contracts to produce a thread having a pitch which is less than said nominal pitch; and wherein the thread includes a plurality of lobes and wherein adjacent portions of the thread at the same angular position along the shaft are separated from each other by a distance equal to approximately twice the width of one of the plurality of lobes.

* * * * *